June 14, 1960

H. W. GREER 2,940,234

CAPSULE SEALING APPARATUS

Filed Jan. 14, 1957

INVENTOR.
HENRY W. GREER
BY
ATTORNEYS

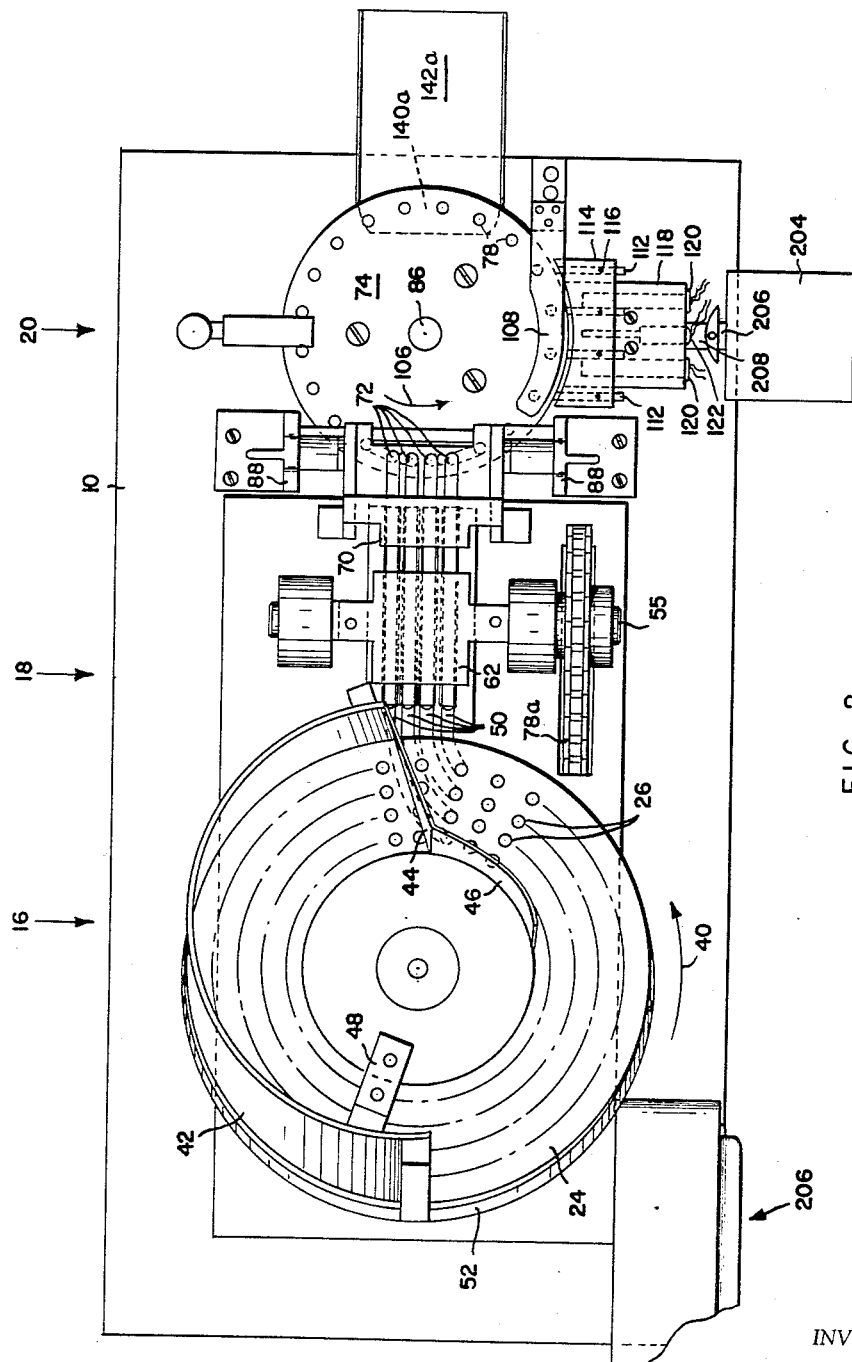

June 14, 1960     H. W. GREER     2,940,234
CAPSULE SEALING APPARATUS

Filed Jan. 14, 1957     4 Sheets-Sheet 3

*INVENTOR.*
HENRY W. GREER
BY
ATTORNEYS

June 14, 1960     H. W. GREER     2,940,234
CAPSULE SEALING APPARATUS

Filed Jan. 14, 1957     4 Sheets-Sheet 4

INVENTOR.
HENRY W. GREER
BY
ATTORNEYS

United States Patent Office 2,940,234
Patented June 14, 1960

2,940,234

CAPSULE SEALING APPARATUS

Henry W. Greer, Philadelphia, Pa., assignor to Smith Kline & French Laboratories, Philadelphia, Pa., a corporation of Pennsylvania Filed Jan. 14, 1957, Ser. No. 633,932

5 Claims. (Cl. 53—285)

This invention relates to capsule sealing apparatus and, more particularly, to apparatus for receiving random positioned closed capsules either in succession or in bulk and for sealing together the cap and body portions of the capsules to prevent separation of the capsules.

In the packaging of medicaments capsules which have been filled with a desired material and closed must be handled through various apparatus in the course of their progress from capsule filling apparatus to the container into which they are ultimately packaged. During this handling capsules tend to become separated or fall apart causing their contents to be spilled and interrupting various handling operations due to the obstruction caused by the spilled contents and the separated capsule parts. If capsules separate after counting or after they have been counted into a package for shipment, it is necessary that the package be withdrawn from the production sequence, emptied and refilled with a freshly counted group of capsules.

From the foregoing it will be evident that numerous difficulties are encountered in the production operations associated with capsule filling and packaging when capsules separate. It is accordingly the principal object of this invention to provide apparatus for sealing the capsule parts together in order to prevent separation of these parts and the resulting interruption to production operations.

It is a further object of the invention to provide for the sealing together of capsule parts in such a manner as not to interfere with subsequently applied identification marks or lettering on the capsules.

It is a further object of the invention to provide for the sealing of capsule parts in such a manner that the sealing will not mar or otherwise deform the capsule and that the seal will be substantially invisible.

These and other objects of the invention will become evident from the following description when read in conjunction with the accompanying drawings in which:

Figure 2 is a top view of the apparatus;

Figures 1, 3:
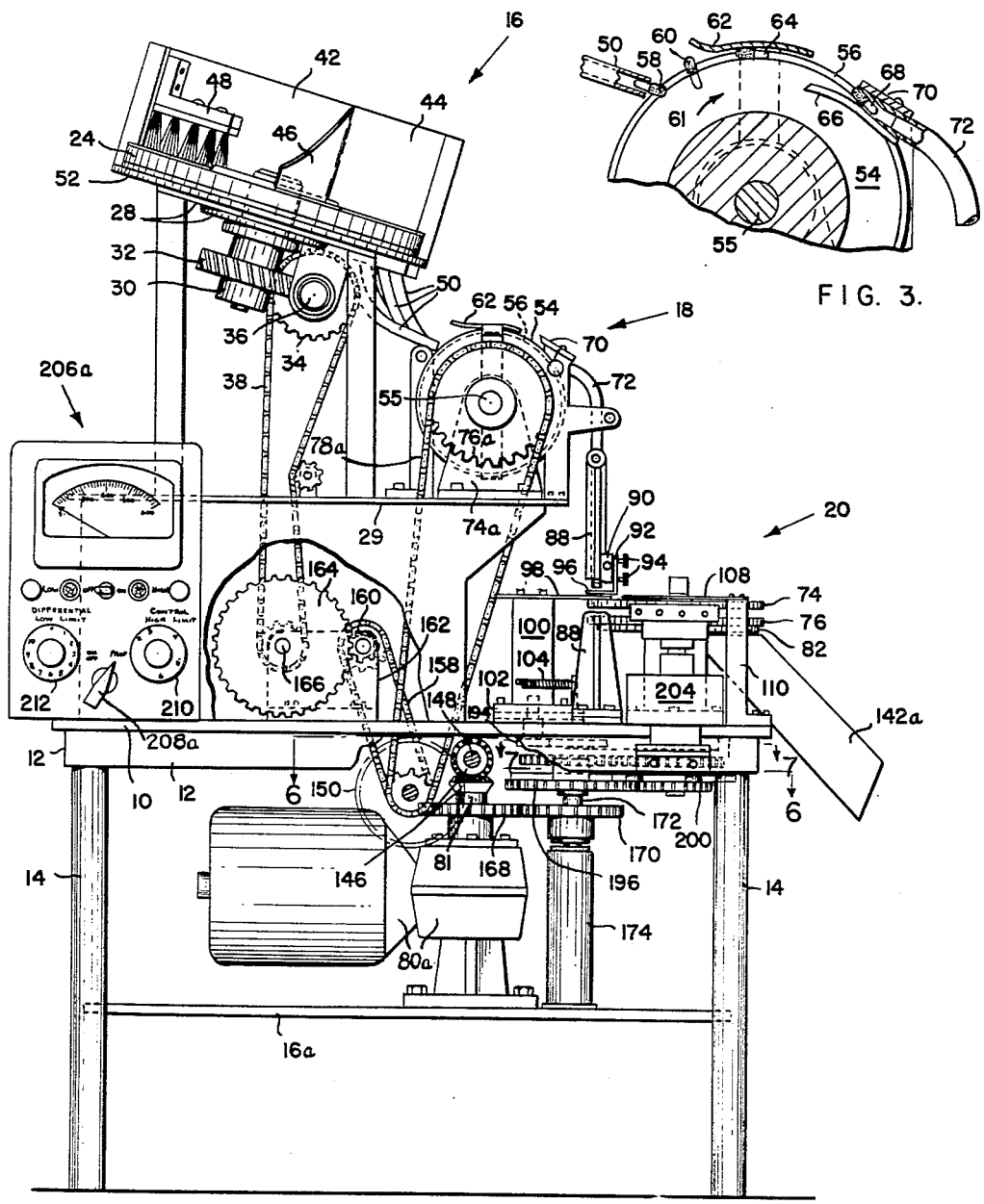
Figure 1 is a partially cutaway side elevation of the apparatus.
Figure 3 is an enlarged fragmentary cutaway showing of a portion of the apparatus shown in Figure 1.

As best shown in Figure 1 the apparatus includes a horizontal base plate 10 affixed to the upper edges of vertically extending side plates 12 which are mounted on vertically extending tubular legs 14 adapted to rest upon a suitable supporting surface.

Positioned above the base plate 10, as indicated generally in Figures 1 and 2, are means indicated at 16 for feeding capsules successively from a bulk quantity thereof, means indicated generally at 18 for positioning successive capsules with the capsule body portion forward as the capsules progress from the feeding means to means indicated generally at 20 for positioning and sealing positioned closed capsule parts together.

The feeding means indicated generally at 16 includes a rotatable disc 24 provided with a plurality of annular arrays of bores 26 extending longitudinally through the disc. The disc is mounted for rotation on supporting means 28 and is affixed to a shaft 30 mounting a gear 32 driven by a gear 34 affixed to a shaft 36 driven by a chain 38 which is in turn driven by means which will be hereafter described.

The disc 24 which rotates in the direction indicated by the arrow 40 in Figure 2 is provided around approximately half of its periphery with an upstanding retainer plate 42. The retainer plate is provided at its lower or right-hand portion as viewed in Figures 1 and 2 with a radially inwardly turned portion 44 which extends across the face of the disc 24 and terminates in an arcuated formed portion 46. The plate 42, 44, 46 serves to retain a plurality of capsules in random relation above the disc 24 while the disc rotates. As the disc rotates capsules will drop into the bores 26 and be carried generally upwardly as viewed in Figure 1 and pass under a brush 48 arranged to sweep the surface of the disc 24 and to prevent capsules which have not entered the bores 26 from being carried upwardly past the brush. If an adequate quantity of capsules is maintained within the retainer plate each of the bores 26 will have received a capsule from the random supply and will carry the capsule past the brush 48 as the disc 24 rotates, the brush, however, preventing the disc from carrying any capsules therepast which are not positioned in bores 26.

A plurality of tubes 50 are positioned below the plate 24 in generally radial alignment and in vertically extending arrangement with their uppermost ends each in alignment with an annular array of bores 26. A stationary plate 52 is positioned immediately below the rotating disc 26 and prevents capsules from falling through the bores 26 except into the tubes 50. The tubes 50 pass through bores in the plate 52 and thus as the bores 26 in the disc 24 pass over the upper end of the tubes 50 the capsules contained within the bores 26 will drop downwardly into the tubes 50.

The apparatus indicated generally at 18 in Figures 1 and 2 for arranging the capsules in proper end-to-end relation is shown enlarged and fragmentarily in Figure 3 and includes a plurality of adjacently positioned discs 54 fixedly mounted on a shaft 55 and having their peripheries beleved as indicated at 56 and spaced apart so as to receive capsules 58 passing from the lowermost ends of the tubes 50. The spacing between the discs is selected to permit the body portions of the capsules to fall between the discs while preventing the cap portions of the capsules from passing between the discs thus positioning the capsules as indicated by the capsule 60.

The discs rotate in the direction of the arrow 61. The successive capsules are carried by the rotating discs under a plate 62 which deflects the cap portions of the capsules downwardly or backwardly and causes the capsules to advance in a generally horizontal position. The capsules advancing to the right as viewed in Figure 3 pass with their leading or body ends above plates 66 extending between the discs 54 which position the capsules for passage under a plate 70 and for entry into tubes 72 with the body ends of the capsules leading as indicated by the capsule 68.

The shaft 55 mounting the discs 54 is supported by conventional bearing blocks 74a mounted on a plate 29. A gear 76a affixed to the shaft 55 is driven by a chain 78a which is in turn driven by a speed reducer and motor assembly 80a mounted on a plate 16a supported by the legs 14 below the base plate 10. Details of this driving arrangement will be hereinafter described.

It will be evident from the foregoing that each of the annular arrays of the bores 26 in the plate 24 discharges a succession of capsules to a tube 50 and each tube 50 discharges its capsules to a groove between adjacent discs 54. These capsules are positioned and each succession of positioned capsules is discharged to a corresponding tube 72. Thus, there occurs a plurality of adjacently arranged lines of capsules being conducted downwardly by the tubes 72.

The actual capsule sealing operation is accomplished with the capsules positioned in aligning bores 78 and 80 formed in spaced adjacently positioned rotatably mounted discs 74 and 76, respectively. Disc 76, the lowermost of these two discs, is positioned immediately above a stationary disc 82 and capsules such as the capsule 84 shown in Figure 5 positioned in the aligning bores have their lower ends resting upon the stationary plate 82. The discs 74 and 76 are fixed to a vertically extending shaft 86 which is driven by means which will be hereinafter described.

The bores 78 and 80 in the discs 74 and 76, respectively, are positioned so as to pass in linear array below the lowermost end of the tubes 72 which terminate immediately above disc 74 and are spaced apart at their lower ends by a distance equal to the circumferential spacing between the bores 78.

The lower ends of the tubes 72 are supported between a pair of vertically extending brackets 88 by means of a block 90 affixed to and extending between the brackets 88 shown in Figure 1 cut away in the region of the lower ends of the tubes 72 and of the disc 74. An angle plate 92 is movably mounted on the block 90 by means of a pair of thumb screws 94 and has its lower or horizontal portion 96 provided with bores which may be movable into or out of alignment with the lower ends of the tubes 72. This angle plate is provided to permit observation of operation of the sealing apparatus associated with the discs 74 and 76 while capsules are prevented from entering the discs. Normally, however, the plate 92 will be so positioned as to permit capsules falling through the tubes 72 to pass freely therethrough.

A horizontal plate 98 is positioned to extend between the angle plate 96 and the top of the uppermost disc 74. The plate 98 is affixed to a support post 100 which is slidably mounted in guide ways 102 for movement to the left and to the right as viewed in Figure 1. The support post 100 is urged to the right by means of a spring 104 and is intermittently moved to the left by drive means which will be hereinafter described. When the plate 98 is in its right-handmost position in response to the urging of spring 104 it will serve to block the passage of capsules from the tubes 72 to the bores in the discs 74 and 76. When the plate 98 is in its left-handmost position its right-hand end is clear of the lower ends of the tubes 72 and capsules within the tubes are free to drop therefrom and into bores 78 and 80 in the discs 74 and 76, respectively, which are in alignment therewith as will be hereinafter described.

Figure 4:
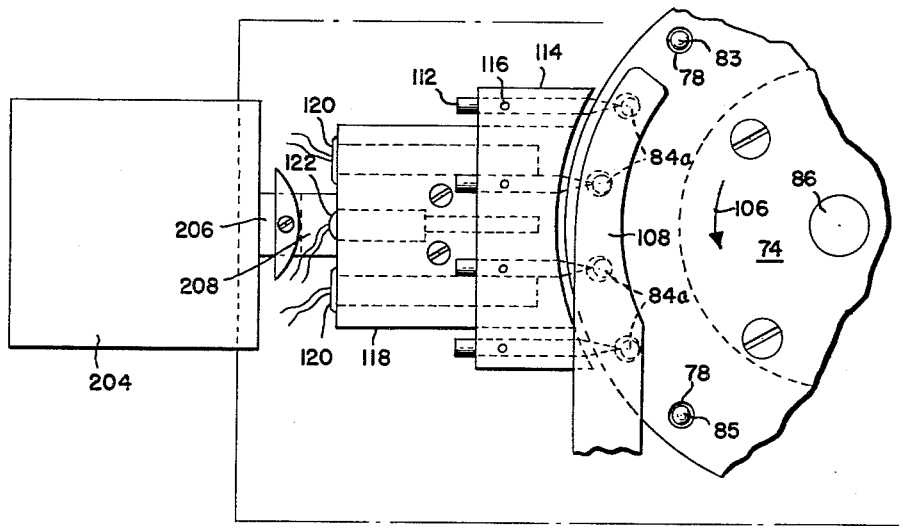
Figure 4 is an enlarged top view of a fragmentary portion of the apparatus.

The disc 74 and the disc 76 in rigid relation therewith rotate intermittently in the direction indicated by the arrow 106 in Figure 4. This rotation carries empty bores in the discs 74 and 76 into position below the lower ends of tubes 72, and carries capsules 84, positioned within the bores 78, to positions indicated at 84a beneath a stationary plate 108 supported by means of a vertically extending post 110 affixed to the base plate 10. The spacing between the plate 108 and the plate 82 is selected to insure that capsules are properly closed when they are sealed.

Figure 5:
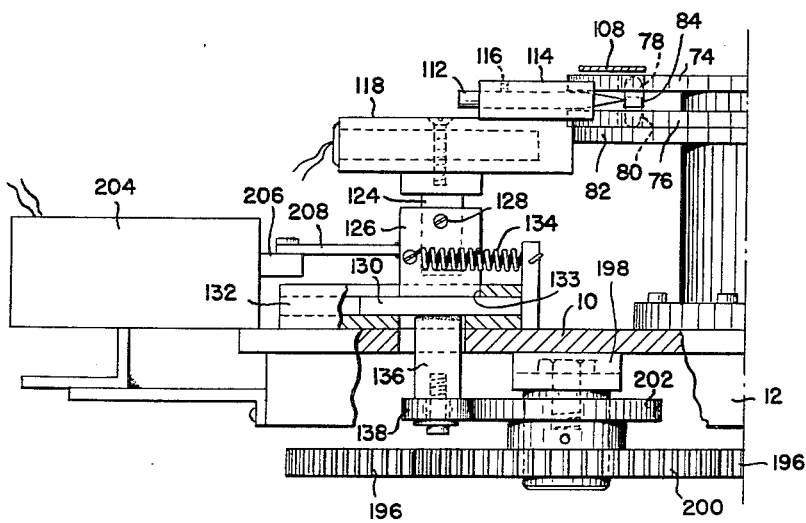
Figure 5 is a partially cutaway vertical section through the apparatus shown in Figure 4.

The actual sealing of the capsules is accomplished by apparatus best shown in Figures 4 and 5 including four rods 112 adjustably mounted in horizontally extending bores in a support block 114 and positioned therein by means of set screws 116. The block 114 is affixed to a block 118 containing heating elements 120 and a temperature responsive element 122. The block 118 is supported by a post 124 affixed to a block 126 in vertically adjustable relation by means of a set screw 128. The block 126 is affixed to a plate 130 horizontally slidably mounted in a gib assembly 132 affixed to the base plate 10. A spring 134 urges the movable assembly and the pins 112 to the right as viewed in Figures 4 and 5 and a downwardly extending member 136 mounting a cam follower roller 138 is acted upon by a cam to move the assembly to the left as will be hereinafter described.

Figure 8:
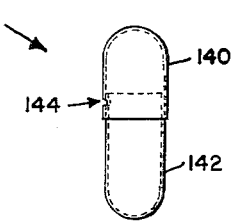
Figure 8 is an enlarged view of a capsule sealed in accordance with the invention.
Figure 7:
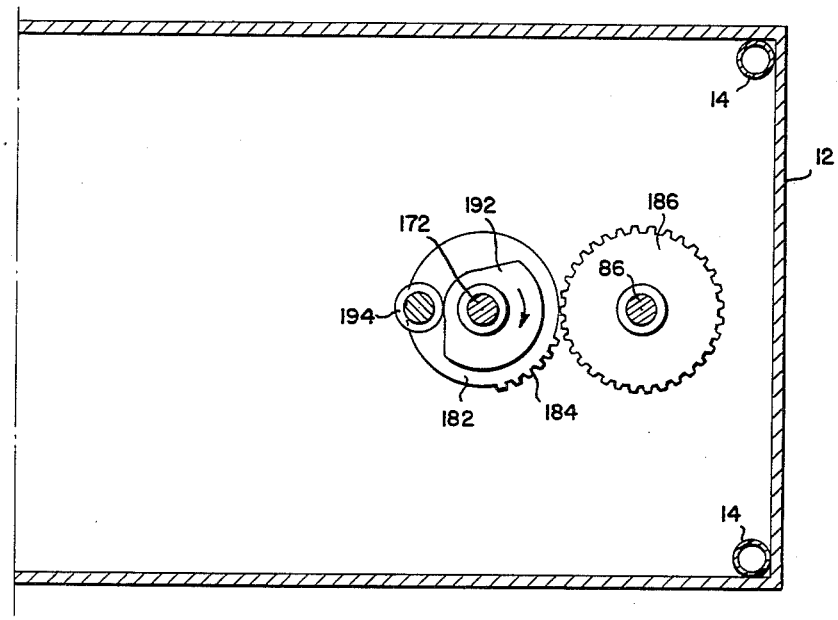
Figure 7 is a fragmentary showing of a transverse section taken through the apparatus taken on the trace 7—7 in Figure 1.

The four pins 112 are so positioned as to engage capsules 84 in the bores 78 and 80 in the discs 74 and 76, respectively, when the pins and their mounting assembly are in a right-hand position as shown in Figures 4 and 5 in response to the urging of the spring 134. The elevation of the pointed ends of the pins 112 as viewed in Figure 5 is adjusted so as to engage the capsules in the region of overlap of the capsule cap with the capsule body. As indicated generally at 84 in Figure 8 there is shown a capsule having a cap 140 and a body 142. In the region of overlap of these parts there is a slight depression 144. This depression is brought about by the engagement of the pointed end of one of the heated rods 112 with the overlapping portions of a closed capsule assembly. While in Figure 8 the depression is shown in somewhat exaggerated form, it will be evident that there will occur a slight depression accompanied by a softening of the gelatinous material from which the capsule is formed thus giving rise to a sealing together of the capsule cap and body parts. The spring 134 is selected to move the block 126 into engagement with the stop formed at the end of the cutout in the top plate of the gib assembly 132 as indicated at 133. By individually adjusting the positions of the pointed ends of the rods 112, the amount of force with which they engage the capsules and the degree to which they may indent capsules is adjusted. Thus, excessive deformation of the capsules cannot occur.

After the capsules have been sealed the next period of rotation of the disc 74 will carry the four sealed capsules past the rods 112 and will carry four unsealed capsules into position before the rods 112. This rotation will carry capsules over a cutaway portion 140a of the stationary disc 82 at which location the capsules drop from the bores 78 and 80 in the discs 74 and 76, respectively, and fall onto a chute 142a in which they are discharged from the apparatus.

The drive mechanism for the apparatus includes the motor and speed reducer assembly 80a positioned on the plate 16a supported by the legs 14 below the base plate 10. A shaft 81 driven by the speed reducer and motor assembly 80a is connnected through beveled gears 146 to a cross shaft 148 mounted on the underside of the base plate 10. A second cross shaft 152 is driven from the shaft 148 through a pair of mating spur gears 150. The cross shaft 152 mounts sprockets 154 and 156. The sprocket 154 carries a drive chain 158 shown fragmentarily in Figure 6 and shown more fully in Figure 1. The chain 158 passes over a sprocket mounted on a shaft 160 rotatably supported by a bearing block 162 affixed to the upper surface of the plate 10. The shaft 160 carries a spur gear which meshes with a spur gear 164 affixed to a shaft 166 also mounted in the bearing block 162. The shaft 166 carries the sprocket driving the chain 38 previously described for driving the disc 24 of the capsule feeding apparatus indicated generally at 16 in Figure 1.

Figure 6:
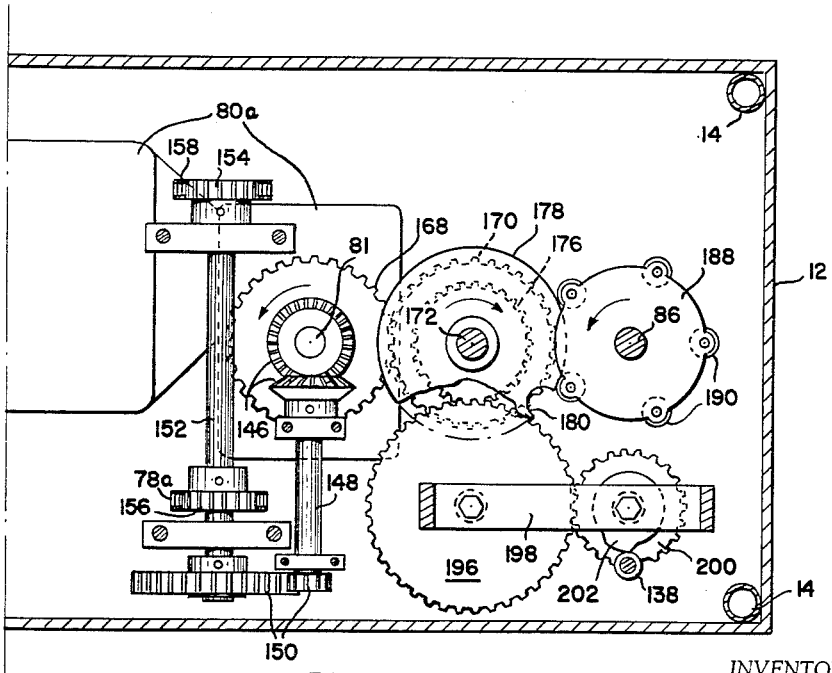
Figure 6 is a transverse section through a portion of the apparatus taken on the trace 6—6 shown in Figure 1.

The sprocket 156 on the shaft 152 carries the chain 78a, shown fragmentarily in Figure 6 and more fully shown in Figure 1 which in turn serves to drive the capsule positioning apparatus indicated generally at 18 in Figure 1.

A gear 168 affixed to the shaft 81 is in driving relation with a gear 170 rotatably mounted on a shaft 172 supported by means of a post 174 from the plate 16a and having its upper end mounted in a bushing affixed to the underside of the base plate 10 and not shown in the figures. A gear 176, shown in Figure 6, is affixed to the shaft 172 above the gear 170 for a purpose as will be hereinafter described. A disc 178 is affixed to the shaft 172 above the gear 176. The disc 178 is provided with a semicircular recess 180 in its periphery. A fragmentary gear 182 having teeth 184 along only a portion of its periphery is affixed to the shaft 172 above the disc 178.

As previously described, the capsule carrying discs 74 and 76 are affixed to a rotatably mounted shaft 86. The shaft 86 extends below the base plate 10 and carries a gear 186 adapted to mesh with the fragmentary toothed portion 184 of the disc 182. Below the gear 186 the shaft 86 carries a disc 188 which around its periphery mounts five rollers 90. The gear 186 is positioned to engage the teeth 184 on the disc 182 and the rollers 190 are positioned to enter the recess 180 in the disc 178. It will be evident that upon driving rotation of the disc 182 the toothed portion 184 thereof will cause intermittent fragmentary rotations of the gear 186. The rollers 190 and the recess 180 are so positioned that upon engagement of the teeth 184 with the gear 186 a roller 190 enters the recess 180 whereas at the completion of the engagement of the teeth 184 with the gear 186 a pair of rollers 190 engage the periphery of the disc 178 and hold the disc 178 and the gear 186 stationary. The arrangement is such as to rotate the shaft 86 one fifth of a revolution upon each rotation of the shaft 172 and to lock the discs 74 and 76 against movement between intermittent rotations. The discs 74 and 76 carry 20 bores, thus upon a fifth of a revolution the discs will advance four bores. Accordingly, four empty capsule receiving bores will be positioned under the tubes 72 with each advance of the discs 74 and 76 and four unsealed capsules will be presented to the sealing apparatus upon each advance of the discs.

Also affixed to the shaft 172 is a cam 192 which acts upon a cam follower 194. The cam follower 194 is affixed to the support post 100 and thus serves to actuate the plate 98 in proper synchronism with the advance of the discs 74 and 76. The cam 192 is so formed and positioned with respect to the toothed portion 184 of the disc 182 as to open the lower ends of the tube 72 when the discs 74 and 76 are stationary and to close off the lower ends of the tubes when the discs are advancing.

The gear 176 mounted on the shaft 172 is in driving relation with a gear 196 rotatably mounted on frame 198 affixed to the underside of the base plate 10. The gear 196 drives a mating gear 200 which is similarly mounted on a shaft affixed to the frame 198 and carries a cam 202 in engagement with the cam follower 138. The formation and position of the cam 202 are so selected as to cause a movement of the heated rods 112 to the left as viewed in Figure 5 during the time interval of rotation of the discs 74 and 76 and to permit movement of the rods 112 to the right in response to the urging of the spring 134 when the discs 74 and 76 are stationary.

A solenoid 204 has its armature 206 connnected by a link 208 to the block 126 of the sealing pin mounting assembly. Energization of the solenoid 204 serves to withdraw the pins from engagement with capsules in the discs 74 and 76 against the urging of the spring 134 regardless of the position of the cam 202.

The control for the heaters 120 which is responsive to the temperature responsive elements 122 is shown generally at 206a in Figure 1. This apparatus is an entirely conventional type of heat control apparatus and need not be described in detail other than by brief reference to a control member 208a by means of which the heating apparatus is turned on and off and high and low temperature control dials 210 and 212, respectively, by means of which the upper and lower temperature limits of the sealing rods 112 are controlled.

The motor control mechanism is entirely conventional and need not be described in detail. Similarly, the control for the solenoid 204 involves the use of conventional apparatus. Control is provided whereby whenever the heating elements are energized, the solenoid is also energized unless the motor 80a is operating. Thus, heated rods 112 will not be permitted to remain in engagement with capsules for a period greater than that required to effect proper sealing of the capsules.

It will be evident that the apparatus described provides a fully automatic arrangement for sealing capsules, and provides an arrangement which is adapted to receive capsules either in bulk quantities or in continuous feed from a capsule filling apparatus and which will serve to discharge sealed closed capsules.

What is claimed is:

1. In capsule treating apparatus, the combination comprising revoluble means for receiving a succession of groups of said closed capsules, sealing means including a plurality of heated members simultaneously movable into engagement each with overlapping cap and body portions of a capsule disposed in said revoluble capsule receiving means, means for intermittently advancing said capsule receiving means, and means for simultaneously moving said plurality of heated members into sealing engagement with capsules disposed in said capsule receiving means between intermittent advances of the same.

2. The combination defined in claim 1 wherein the capsule receiving means is revoluble about a fixed axis and is provided with an annular array of axially extending through bores each adapted for receiving one of said capsules and maintaining the same with its longitudinal axis generally parallel to the fixed axis aforesaid of said revoluble capsule receiving means.

3. The combination defined in claim 1 wherein the capsule receiving means is provided with an annular array of capsule receiving bores, and the heated members are mounted for shifting movement radially inwardly simultaneously into engagement with a group of the capsules disposed in said revoluble capsule receiving means and positioned for being sealed.

4. The combination defined in claim 1 wherein the capsule receiving means is provided with an annular array of capsule receiving bores, the heated members are assembled in a reciprocable unit, and means is provided for reciprocating said unit so that between intermittent advances of said capsule receiving means said assembly advances radially inwardly to engage a group of the capsules disposed in said revoluble capsule receiving means and positioned for being sealed, and during intermittent advances of said receiving means said assembly retracts radially outwardly from sealing engagement with said group of capsules.

5. The combination defined in claim 1 wherein the revoluble capsule receiving means includes a pair of axially spaced relatively fixed discs provided with an annular array of paired capsule receiving bores, each pair of said bores being formed respectively in said pair of discs, and being coaxially aligned, and the heated members are removably freely received between said discs when moved to sealing position.

References Cited in the file of this patent

UNITED STATES PATENTS

| | | |
|---|---|---|
| 2,630,953 | Kath | Mar. 10, 1953 |
| 2,738,827 | Roll | Mar. 20, 1956 |
| 2,764,862 | Rado | Oct. 2, 1956 |